United States Patent [19]

Ito et al.

[11] Patent Number: 6,038,407
[45] Date of Patent: Mar. 14, 2000

[54] DATA RECORDING DEVICE FOR A DISPOSABLE CAMERA

[75] Inventors: Shinsuke Ito; Hiroaki Shinha; Hitoshi Hasegawa, all of Suwa, Japan

[73] Assignee: Seiko Epson Corporation, Tokyo, Japan

[21] Appl. No.: 09/036,500

[22] Filed: Mar. 6, 1998

[30] Foreign Application Priority Data

Mar. 7, 1997 [JP] Japan .................................. 9-053415

[51] Int. Cl.⁷ ................................................ G03B 17/24
[52] U.S. Cl. ............................................ 396/317; 396/544
[58] Field of Search .................................... 396/310, 315, 396/317, 549, 544; 399/4

[56] References Cited

U.S. PATENT DOCUMENTS 5,339,125  8/1994  Friedman et al. ...................... 396/317
5,721,993  2/1998  Ito et al. ................................. 396/315

FOREIGN PATENT DOCUMENTS 63-133111  6/1988  Japan .
1-163902   6/1989  Japan .
8-114841   7/1996  Japan .

*Primary Examiner*—Safet Metjahic
*Assistant Examiner*—J. K. Han
*Attorney, Agent, or Firm*—Mark P. Watson

[57] ABSTRACT

A data recording device 10 for a camera 1 uses a collecting plate 11 formed of a light transmitting resin with a fluorescent substance dispersed therein as a collecting element for collecting external light. The collecting plate 11 includes a vertically elongated flat light receiving portion 21 and a flat light emitting portion 22 protruding at a right angle from the back side of the light receiving portion, the end portion of the light emitting portion 22 constituting a light emitting surface 22a. External light incident on a surface 21a of the light receiving portion 21 enters the light receiving portion and is absorbed by the fluorescent substance, which generates fluorescence. The fluorescence is propagated through the collecting plate as it is reflected by the interface between the ambient air and the collecting plate before it is applied to a liquid crystal panel 12 for data recording from the light emitting surface 22a of the light emitting portion 22. Unlike a collective lens, the collecting plate is capable of efficiently collecting scattered light, so that it is possible to effect data recording with a sufficient quantity of light.

13 Claims, 7 Drawing Sheets

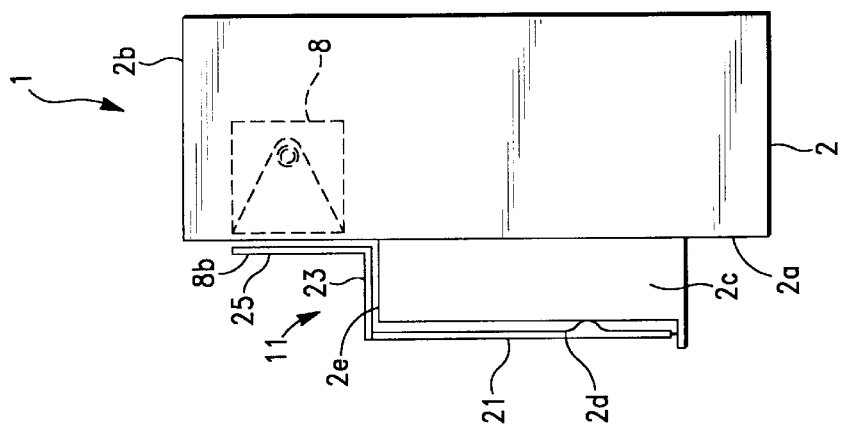
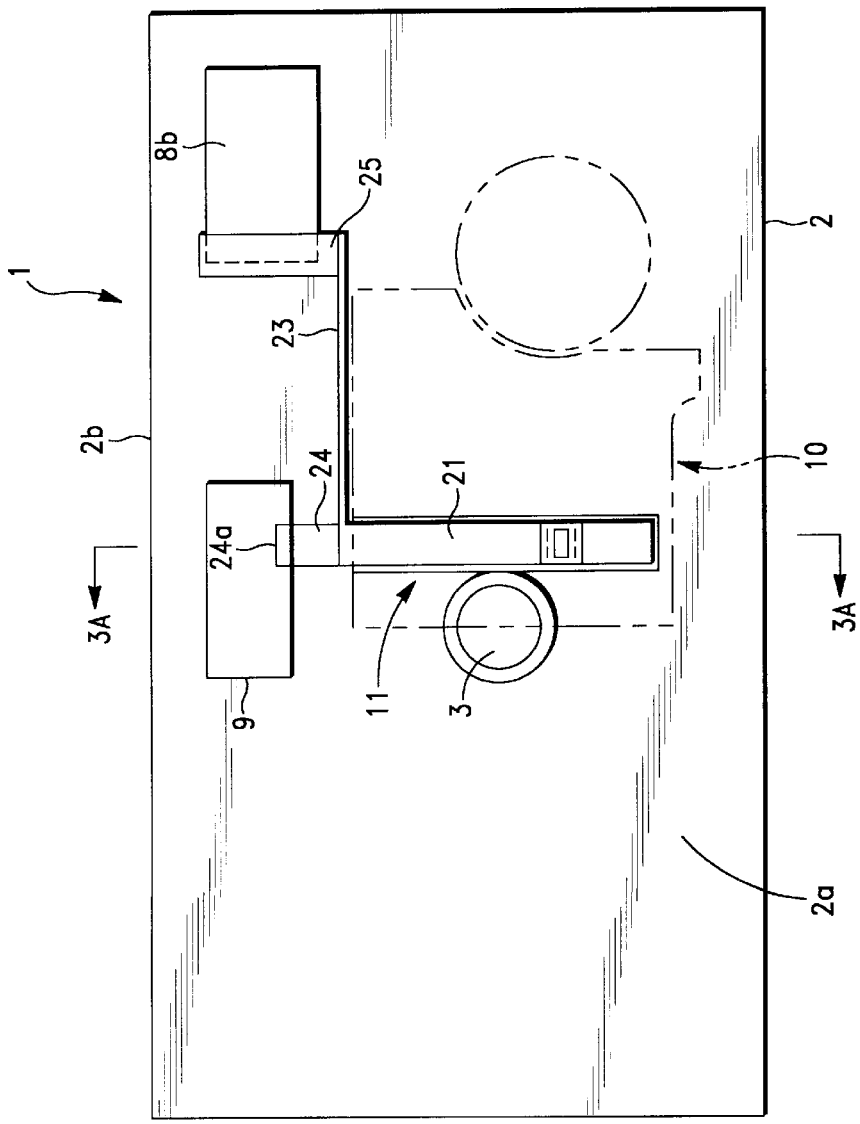
FIG.-2B
FIG.-2A

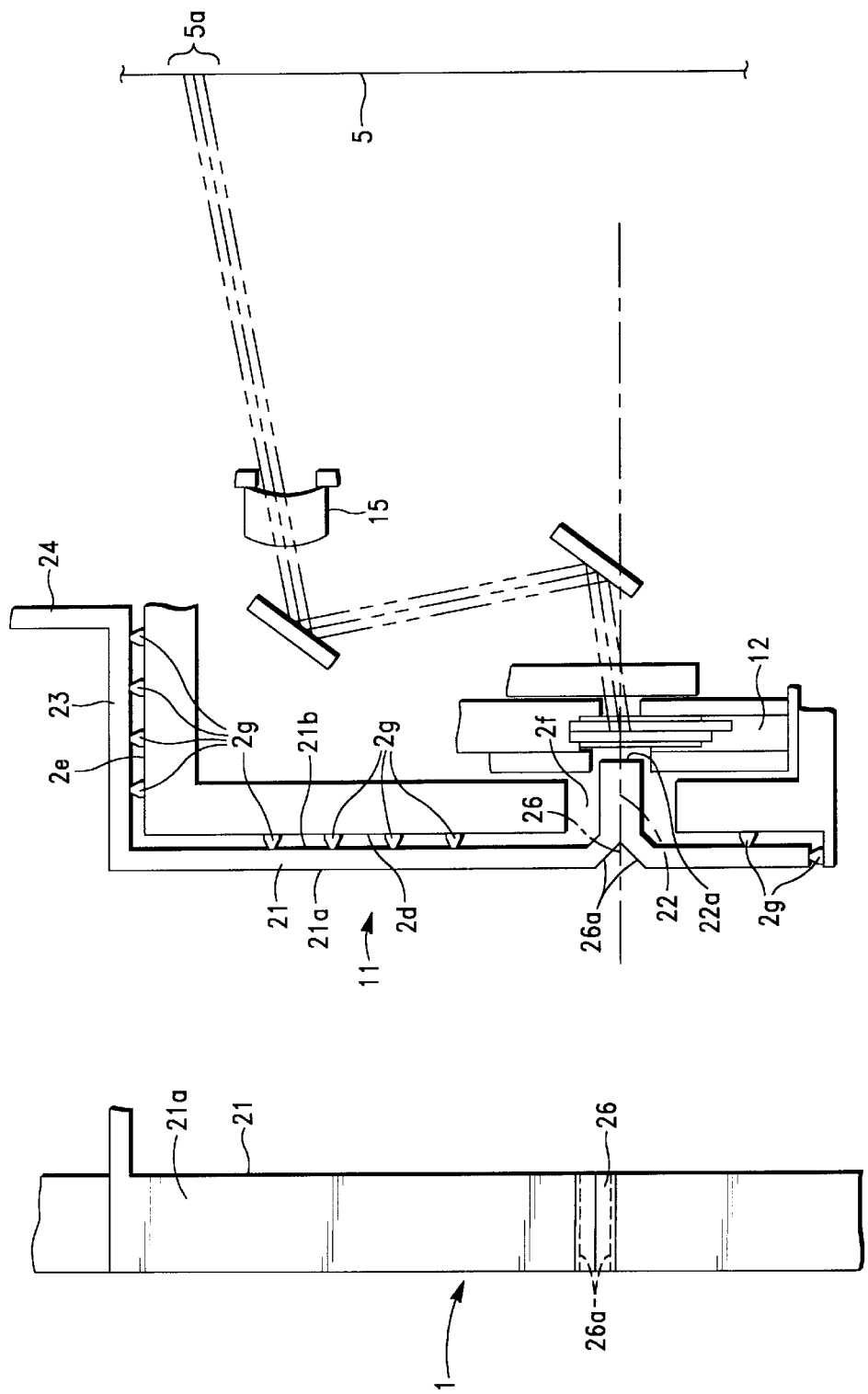

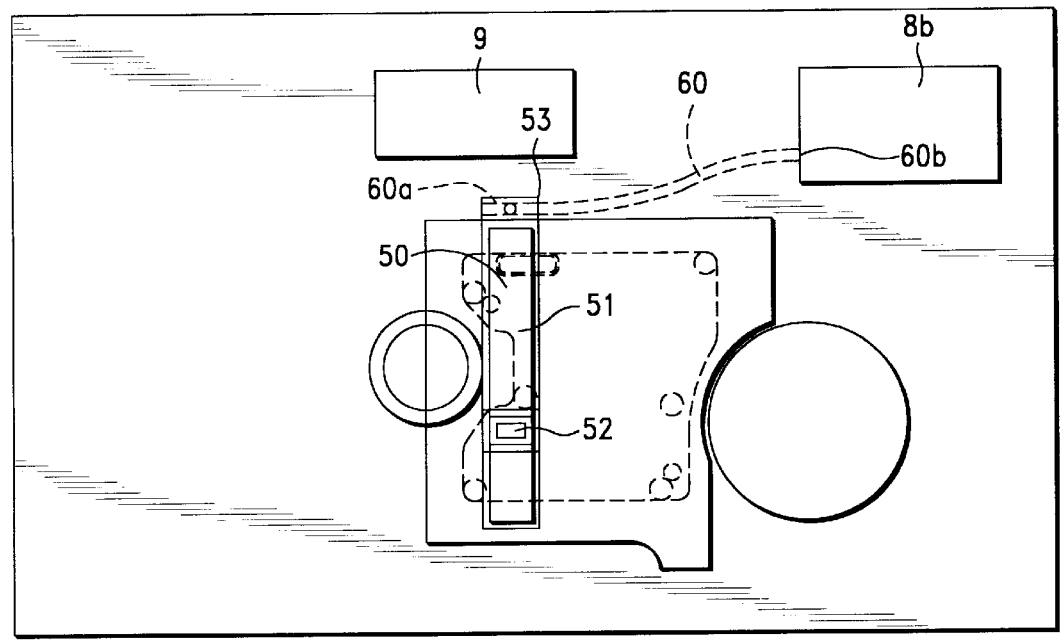
FIG.—6A
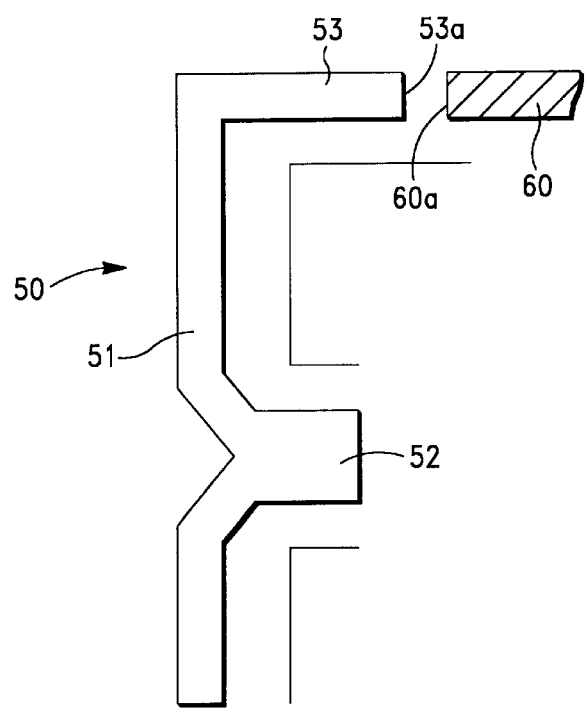
FIG.—6B

DATA RECORDING DEVICE FOR A DISPOSABLE CAMERA

BACKGROUND OF THE INVENTION

1. Field of the Invention

The present invention relates to a data recording device which is mounted in a disposable camera and which is used to record data, such as date and time of photographing, on a photographic film and, more specifically, to a data recording device for a disposable camera of the type which utilizes external light as the light source for recording data.

2. Description of the Related Art

A disposable camera consists of a photographic film housed in a case having a lens. A type of disposable camera is known which is equipped with a data recording device for recording data, such as date and time of photographing, in a predetermined area of the photographic film.

In a known disposable camera of this type, the data recording device does not use a dedicated light source for data recording but uses external light let in through an external light inlet, which is provided on the front side of the case, as the light source for the data recording, so that the disposable camera can be made smaller, more compact and less expensive. The light entering through the external light inlet is incident on a liquid crystal panel, in which a data pattern for data recording is formed as a light transmitting section. Due to the external light transmitted through the liquid crystal panel, the data pattern is transferred to and recorded in a predetermined area of the photographic film.

The above structure has a problem in that, when the external light is used, there is a possibility that a sufficient quantity of light will not be available for data recording. Due to the poor exposure for recording the data pattern, a clear data pattern may not be transferred to and recorded on the photographic film. This problem might be overcome by making the exposure time for data recording longer than the exposure time for photographing. However, this would require a shutter function for opening and closing the external light inlet for a duration different from that for the shutter for photographing. Such a shutter function is not suitable for a disposable camera, which should be made small, compact and inexpensive. To avoid this problem, it is desirable to mount a condensing lens on the external light inlet so as to condense the external light on the liquid crystal panel. A data recording device using a lens for condensing external light has been proposed by the present inventor in Japanese Patent Laid-Open No. 8-114841.

However, when a lens is used for condensing external light, the following problems must be overcome: first, with a condensing lens, it is impossible to efficiently condense the external light components other than the parallel incident light, such as scattered light. Further, when external light, i.e., sunlight, is used as the light source for data recording, the data pattern is recorded on the photographic film in a whitish color. When recorded in a whitish color on the photographic image, the data pattern is difficult to recognize and hard to read.

OBJECTS OF THE INVENTION

It is an object of the present invention to provide a data recording device for a disposable camera equipped with a light condensing element capable of efficiently condensing external light.

Another object of the present invention is to provide a data recording device for a disposable camera equipped with a light condensing element capable of recording a data pattern in a color with high visual recognizability.

SUMMARY OF THE INVENTION

To achieve the above objects, there is provided, in accordance with the present invention, a data recording device for a disposable camera, comprising: a data recording liquid crystal panel forming a light-transmitting data pattern for recording the data pattern on photographic film, and a light condensing element for forming illumination light for illuminating the liquid crystal panel by condensing external light, the data pattern being recorded in a predetermined area of the photographic film accommodated in the disposable camera, wherein the light condensing element consists of a light condensing plate formed of a light-transmitting resin with a fluorescent substance dispersed therein.

The light condensing plate can include a light receiving portion with an external light receiving surface and a light emitting portion which protrudes from the back side of the light receiving portion and whose end surface constitutes a light emitting surface. In this case, the light emitting surface is opposed to the incident side of the liquid crystal panel.

In the data recording device for a disposable camera of the present invention, the external light impinging upon the surface of the light condensing plate enters the light condensing plate and is absorbed by the fluorescent substance, which emits a fluorescence having a wavelength longer than that of the incident light. The majority of the light components of the emitted fluorescence are propagated through the light condensing plate as it is reflected by the interface between the light condensing plate and the ambient air before it is condensed at the light emitting surface, which is the end surface of the light condensing plate, and emitted from this light emitting surface. Thus, unlike the case in which a condensing lens is used, the external light components other than the parallel beam, such as scattered light, can be efficiently condensed, so that a sufficient quantity of external light is condensed as the light source for data recording, whereby a clear data pattern is recorded on the photographic film.

The fluorescent substance may consist of a fluorescent dye, fluorescent pigment or the like which is capable of emitting fluorescence of various colors. The color of the light source for recording data is the fluorescent color of the fluorescent substance used so that it is possible to effect data pattern recording with a higher level of visual recognizability than in the case in which white light is used.

To augment the quantity of external light condensed by the light condensing plate, the light receiving portion of the light condensing plate is formed as a rectangular section which is longer in the direction of the height of the data pattern to be recorded on the photographic film.

For the external light received by the light receiving portion to be efficiently propagated to the light emitting surface, it is desirable to form a V-shaped groove having a depth in the surface of the section of the light receiving portion where the light emitting portion is formed.

Instead of forming a V-shaped groove, another embodiment forms the light emitting portion from the back at a substantially right angle to the light receiving portion with a bent section therebetween, and in which a surface inclined at an angle smaller than 90° with respect to the external light receiving surface is formed on the bent section. In this construction, the light propagated through the light receiving portion is reflected toward the light emitting portion by the inclined surface, thereby enhancing the light emitting efficiency of the light emitting surface.

The light receiving portion may be formed as a flat or a curved surface.

Further, it is desirable for the light condensing plate to include an edge end portion which can be visually observed through a view finder, which is attached to the disposable camera, in order to judge whether flash photography is necessary by visually observing the light emitting condition of the edge end portion at the time of photographing.

Further, it is desirable for the light condensing plate to include a flash light receiving portion for receiving the light emitted from the flash unit with which the disposable camera is equipped. With this feature, the flash light emission, actuated when the exposure is insufficient, can be condensed as the light source for data recording, whereby it is always possible to record a clear data pattern on the photographic film.

Instead of forming the flash light receiving portion on the light condensing plate itself, it is also possible to condense part of the flash light emission on the light condensing plate side by using a light guiding member such as an optical fiber.

To reduce the quantity of light emitted from the end surfaces other than the light emitting surface of the light condensing plate and to increase the quantity of light emitted from the light emitting surface so as to efficiently condense external light, the light emitting surface of the light condensing plate is formed as a rough surface by molding through a mold or die that has been processed by sand blasting and to form the surfaces other than the light emitting surface as mirror finished surfaces.

When the surface of the light condensing plate is in close contact with a side of the disposable camera, to which the light condensing plate is attached, the fluorescence propagated through the close-contact section leaks out, thereby making it impossible to realize an efficient light condensing operation. To avoid this and to make it possible for the fluorescence to be efficiently propagated through the light condensing plate toward the light emitting surface, the light condensing plate is mounted to a side of the disposable camera substantially in a point-contact or line-contact state.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts:

FIG. 2A is a front view and

FIG. 2B is a side view of the disposable camera;

FIG. 3A is a partial sectional view taken along the line 3A—3A of FIG. 2A, and FIG. 3B is a front view of a light receiving portion of a light condensing plate;

FIGS. 5A and 5B are diagrams showing a modification of the light condensing plate shown in FIG. 3, of which FIG. 5A is a partial sectional view of the light condensing plate attached to the disposable camera, and FIG. 5B is a front view of the light receiving portion thereof;

FIG. 6A is a front view of a disposable camera equipped with a light guiding member for condensing flash light, and FIG. 6B is a diagram illustrating a first arrangement of the light condensing plate and the light guiding member.

DESCRIPTION OF THE PREFERRED EMBODIMENTS

A data recording device for a disposable camera according to the present invention will now be described with reference to the drawings.

Figure 1:
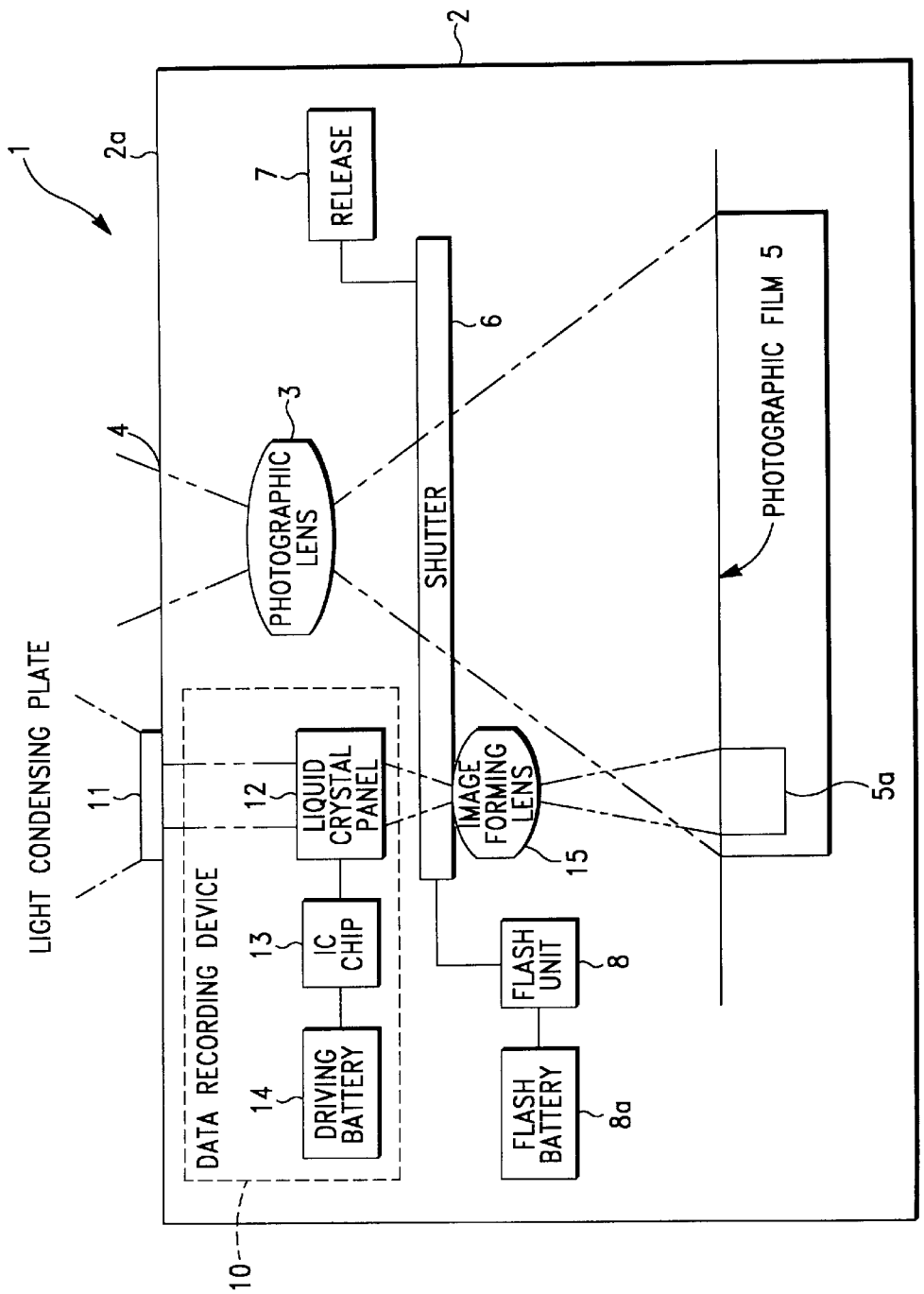
FIG. 1 is a schematic diagram showing a disposable camera of the present invention.

First, with reference to FIG. 1, the general construction of a disposable camera in which a data recording device according to the present invention is mounted will be described. As shown in the drawing, a disposable camera 1 is equipped with a film case 2. A photographic lens 3 is mounted on the front side of the film case 2. Photographic light 4 is transmitted through this photographic lens 3 and forms an image on a photographic film 5 arranged at a predetermined position inside the film case 2. A shutter 6 is arranged between the photographic lens 3 and the photographic film 5. When a release 7 arranged on the upper side of the film case 2 is depressed, the shutter 6 is opened and the photographic light 4 is applied to the photographic film 5. The disposable camera 1 of this embodiment is equipped with a flash unit 8 and a flash battery 8a. When the exposure is insufficient at the time of photographing, the flash unit 8 is driven to emit a flash of light.

A data recording device 10 is mounted in the disposable camera 1. The data recording device 10 includes a light condensing plate 11 attached to the front side 2a of the film case 2 and adapted to condense external light, a liquid crystal panel 12 to which the external light condensed by the light condensing plate 11 is applied, an IC chip 13 on which a drive control circuit for the liquid crystal panel 12 is mounted, and a driving battery 14. The liquid crystal panel 12 includes a light transmitting section that forms a data pattern for recording on the photographic film. The external light transmitted through this light transmitting section is condensed onto a data recording area 5a of the photographic film 5 through an image forming lens 15. The shutter 6 is interposed between the output side of the liquid crystal panel 12 and the image forming lens 15. The optical path between them is formed only at the time of photographing, making it possible to effect data recording only when a photograph is taken.

FIG. 2A is a front view of the disposable camera 1 of this embodiment as seen in the direction of the front side 2a, and FIG. 2B is a side view thereof. As can be seen from these drawings, the photographic lens 3 is arranged substantially at the center of the front side 2a of the film case 2 of the disposable camera 1. The light condensing plate 11 of the data recording device 10 is arranged adjacent to the photographic lens 3. A view finder 9 is mounted in a position above the photographic lens 3 and the light condensing plate 11. A flash light emitting surface 8b of the flash unit 8 is positioned beside the view finder 9.

The light condensing plate 11 consists of a molded product formed of an acrylic resin, polycarbonate resin or the like in which a fluorescent substance, such as a fluorescent pigment or a fluorescent dye, is dispersed. The concentration of the pigment or dye is in the range of 0.02 to 0.12% by weight. It is also possible to disperse a plurality of kinds of pigment or dye. For example, it is possible to disperse two kinds of dye; the concentration of a first kind of dye is in the range of 0.02 to 0.12% and a minute amount (0.001% or less) of a second kind of dye whose peak wavelength is longer than the first dye is mixed with it. By mixing such dyes, the light emission wavelength range of the light condensing plate 11 is enlarged, thereby enabling the data recorded to be easily recognized.

It is desirable to set the peak light emission wavelength of the light condensing plate 11 in the range of 560 to 650 nm and, in particular, in the range of 570 to 600 nm.

FIG. 3A is a partial sectional view taken along the line 3A—3A of FIG. 2A, and FIG. 3B is a front view of a light receiving portion of the light condensing plate 11 as seen in the direction of the front side of the film case 2. First, with reference to FIGS. 2 and 3, the general configuration of the light condensing plate 11 will be described.

The light condensing plate 11 is equipped with a flat light receiving portion 21 which is rectangular and elongated in the vertical direction of the film case 2. The surface (front surface) 21a of this light receiving portion 21 constitutes the light receiving surface for receiving external light. A flat light emitting portion 22 is formed so as to protrude at a right angle from the middle position of the back surface 21b of the light receiving portion 21. The end surface 22a of this light emitting portion 22 constitutes the light emitting surface, which emits fluorescence corresponding to the condensed external light.

As described above, the light receiving portion 21 of the light condensing plate 11 is elongated in the vertical direction of the film case 2. In other words, it is elongated in the direction of the height of the data pattern for recording formed by the light transmitting section of the liquid crystal panel 12. By thus vertically elongating the light receiving portion 21, it is possible to enhance the external light condensing efficiency for the light emitting portion 22 as compared to an arrangement in which the light receiving portion 21 is elongated laterally, i.e., in the direction of the width of the data pattern for recording.

In addition to the light receiving portion 21 and the light emitting portion 22, the light condensing plate 11 of this embodiment includes, at the upper end of the light receiving portion 21, a flat bent portion 23, which extends toward film case 2 at a right angle from receiving portion 21 toward the film case 2 side. An end section of this bent portion 23, which is directly below the finder 9, is bent upwardly at a right angle to portion 23 and extends upwards to constitute a flat extension 24. The upper edge 24a of this extension 24 is positioned in the visual field of the view finder 9. Further, the bent portion 23 extends horizontally toward the flash-light emitting surface 8b, and a section of the bent portion 23 which is directly below the flash light emitting surface 8b is bent upwardly at a right angle to constitute a flat flash-light receiving portion 25 covering part of the flash-light emitting surface 8b.

As described above, the light condensing plate 11 of this embodiment is equipped with an edge 24a protruding into the visual field of the view finder 9. This edge 24a also functions as the light emitting portion of the light condensing plate 11, so that it is possible to check the brightness of the external light on the basis of the light emitting condition of this edge 24a. That is, when the quantity of light emitted from this portion is small, the quantity of external light is small, so that flash photography is necessary. On the other hand, when the quantity of light emitted from this portion is large, the quantity of external light is large, so that there is sufficient exposure for photographing, which means there is no need for flash-light emission.

Further, since the light condensing plate 11 of this embodiment is equipped with the flash-light receiving portion 25, which covers part of the flash-light emitting surface 8b, it is possible to condense emitted flash-light by the light condensing plate 11. As a result, in addition to the external light, it is possible to utilize the flash-light emission as the light source for data recording, so that data can be clearly recorded even when there is a shortage of external light.

Next, the configuration of the light condensing plate 11 will be described in more detail mainly with reference to FIG. 3. In the light condensing plate 11 of this embodiment, a V-shaped groove 26 having a predetermined depth in the direction toward the back of case 2 is formed in the surface of the light receiving portion 21 at a position corresponding to the light emitting portion 22. The inclined surfaces 26a on either side of the V-shaped groove 26 are inclined at substantially 45° with respect to the surface 21a of the light receiving portion 21. The fluorescence propagated through the light receiving portion 21 is reflected by surfaces 26a, inclined at 45°, and is transmitted toward the light emitting portion 22, whereby the light emission efficiency of the light emitting surface 22a is enhanced.

In addition to the above features, in the light condensing plate 11 of this embodiment, the light emitting surface 22a is formed as a rough surface by molding through a mold or die that has been processed by sand blasting, whereas the remaining end surfaces of the light condensing plate are formed as mirror finished surfaces, whereby it is possible to limit the proportion of the light output from the end surfaces other than the light emitting surface 22a after being propagated through the light condensing plate 11, thereby making it possible to enhance the light emission efficiency of the light emitting surface 22a.

Next, the mounting of the light condensing plate 11 of this embodiment to the film case 2 will be described. As shown in FIGS. 2 and 3, a mounting portion 2c for the data recording device 10 is formed on the front side 2a of the film case 2, the mounting portion 2c being formed as a rectangular protrusion. On the front side of this mounting portion 2c, there is formed a light condensing plate mounting surface 2d, which is large enough to allow the light receiving portion 21 of the light condensing plate to be fitted thereon. Further, the upper surface of the light condensing plate mounting portion 2c, which is formed as a protrusion, constitutes a support surface 2e for supporting the bent portion 23 of the light condensing plate 11. In the light condensing plate mounting surface 2d, there is formed a through-hole 2f for receiving the light emitting portion 22 of the light condensing plate 11. Inside this through-hole 2f, the liquid crystal panel 12 of the data recording device 10 is arranged.

A plurality of protrusions or ridges 2g are formed at predetermined intervals on the light condensing plate mounting surface 2d and the support surface 2e. With these protrusions or ridges 2g, the light condensing plate 11 is secured to the mounting surface 2d and the support surface 2e in a point-contact or line-contact manner. In this way, the light condensing plate 11 is not in close contact with the film case 2, so that the light propagated through the light condensing plate 11 is prevented from leaking out through the contact section, whereby the light emission efficiency of the light emitting surface 22a is enhanced.

Figure 4A:
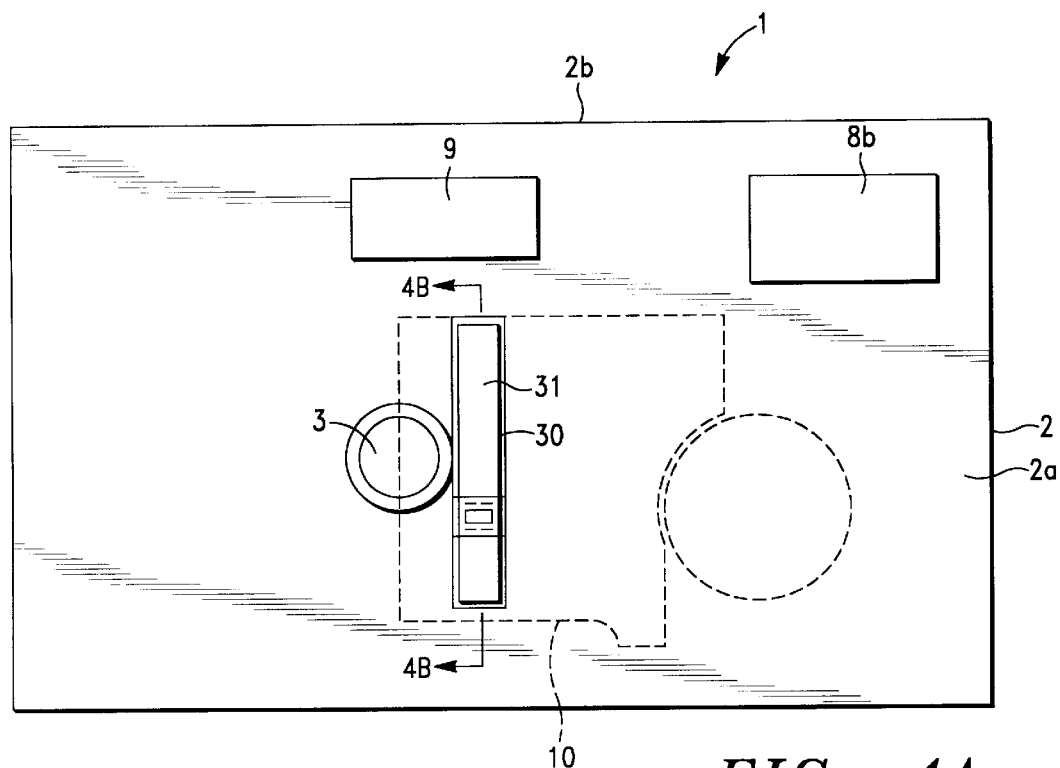
FIG. 4A is a front view of a disposable camera equipped with another light condensing plate embodiment.
Figure 4B:
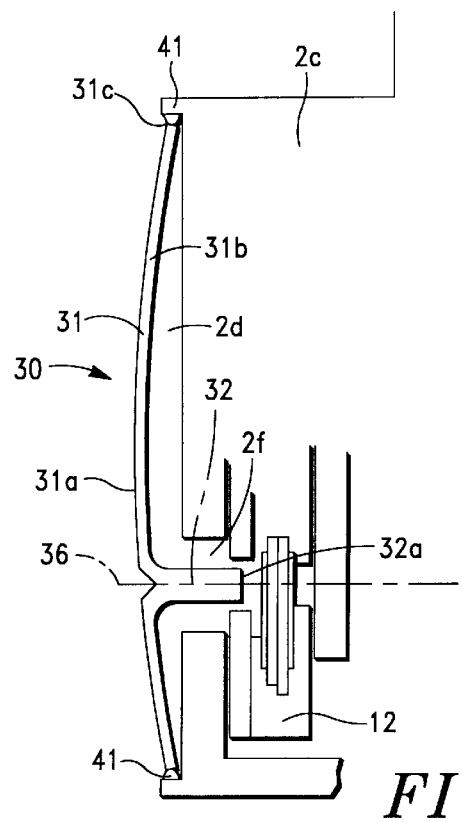
FIG. 4B is a partial sectional view taken along the line 4B—4B of FIG. 4A.

FIG. 4 shows another embodiment of a light condensing plate, which is indicated by reference numeral 30. The light condensing plate 30 includes a light receiving portion 31 whose surface 31a constitutes the surface for receiving external light, and a light emitting portion 32 which protrudes from the back side 31b of the light receiving portion 31. Unlike the light receiving portion of the light condensing plate 11, the light receiving portion 31 is not formed as a flat surface but instead is formed as a forwardly convex curved surface. The light emitting portion 32 is flat, and its end surface constitutes a light emitting surface 32a. A V-shaped groove 36 is formed in the light receiving portion 31 so that the light propagated through the light condensing plate may be efficiently directed to the light emitting portion 32. The outer peripheral end surface 31c of this light condensing plate 30 is supported in a line-contact manner by a protruding frame 41 formed on the film case 2.

Apart from the above, the device has the same construction as that in the above-described disposable camera 1, so, in FIG. 4, the components corresponding to those of the first example are indicated by the same reference numerals, and a description of such components will be omitted.

Forming the light receiving portion 31 as a curved surface is advantageous in that the light receiving area is larger than in the case of a flat light receiving portion. In the light condensing plate 30 of this embodiment, the light emitting surface 32a is also formed as a rough surface, and the peripheral end surface 31c is formed as a mirror finished surface, whereby the light emission from the peripheral end surface 31c is restricted, thereby enhancing the light emission efficiency of the light emitting surface 32a.

Figure 5A:
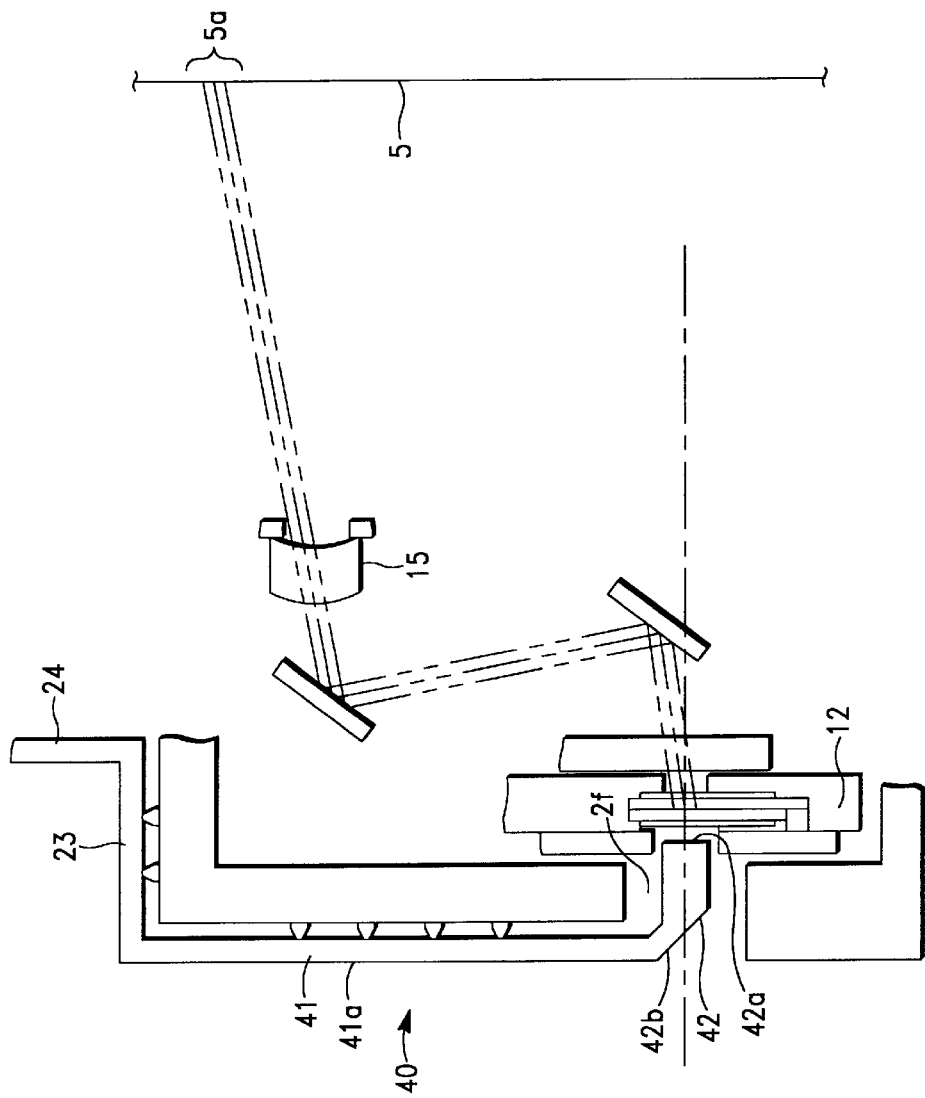
Figure 5B:
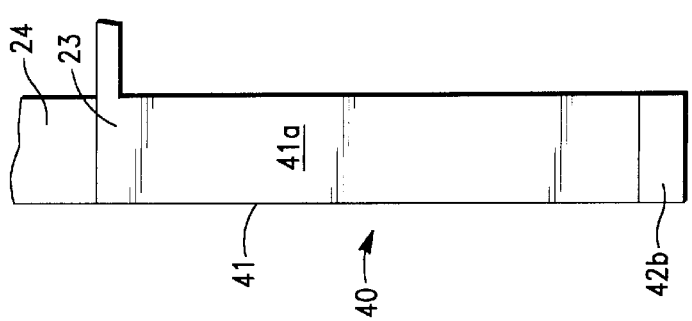

FIG. 5 shows a another modification of the light condensing plate, which is indicated by reference numeral 40. The light condensing plate 40 has basically the same construction as the light condensing plate 11 except that the lower end portion of the flat light receiving portion is bent backwards at a substantially right angle to form a light emitting portion 42 protruding from the back side of the light receiving portion 41. The bent portion, which is between the light receiving portion 41 and the light emitting portion 42, is formed as an inclined surface 42b which is inclined preferably at substantially 45°, but at least less than 90°.

In this light condensing plate 40, constructed as described above, the fluorescence generated by the light condensed by the surface 41a of the light receiving portion 41 is propagated through the light receiving portion 41 and reflected at right angles by the inner side surface (interface) of surface 42b, which is inclined at 45°, before it is transmitted to the light emitting portion 42 thereby enhancing the light emission efficiency of the light emitting surface 42a, which is at the end of the light emitting portion. In the light condensing plate 40 of this embodiment, the area of the inclined surface 42b can be larger than when a V-shaped groove is formed as in the case of the light condensing plate 11. In other words, the area of the reflecting surface for the fluorescence propagated through the light condensing plate can be relatively large, thereby improving the light condensing efficiency of the fluorescence propagated through the light condensing plate.

The essential components of the light condensing plate are the light receiving portion and the light emitting portion. It is not absolutely necessary to form the other portions, that is, the portion protruding into the view finder and the portion extending along the flash-light emitting surface. The light condensing plate 11 shown in FIGS. 1 and 2 may be composed only of the light receiving portion 21 and the light emitting portion 22. Conversely, the light condensing plate 30, shown in FIG. 4, may also include a portion protruding into the finder and a portion extending along the flash-light emitting surface or only one of such portions.

Further, while in the above embodiments the light condensing plate is mounted to the film case, it is also possible to form the front portion of the film case or the entire film case as a light condensing plate.

Further, in the above-described light condensing plates 11 and 40 the portion extending along the flash-light emitting surface is formed integrally with the light condensing plate and serves to condense part of the flash-light. However, instead of forming a portion for condensing flash-light on the light condensing plate, it is also possible to separately arrange a light guiding member to guide part of the flash-light emission to the light condensing plate.

For example, as shown in FIGS. 6A and 6B, another light condensing plate embodiment 50 includes a light receiving portion 51, a light emitting portion 52, and a flash-light emission introducing portion 53, which is bent at a right angle backwards from the upper end of the light receiving portion. One end 60a of a light guiding member 60, consisting of an optical fiber, for example, is opposed to the end surface 53a of the flash-light emission introducing portion 53, and the other end 60b of the light guiding member 60 is arranged on the flash-light emission side. In this arrangement the requisite quantity of light for data recording is still obtained by utilizing part of the flash-light emission.

Figure 7A:
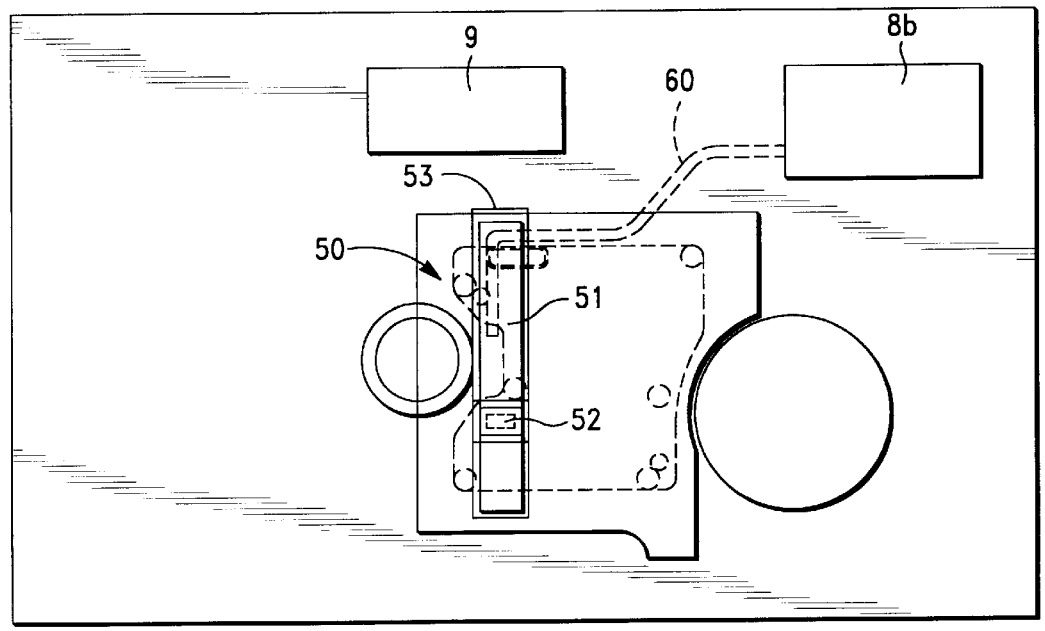
FIG. 7A is a front view of a disposable camera equipped with a light guiding member for condensing flash light.
Figure 7B:
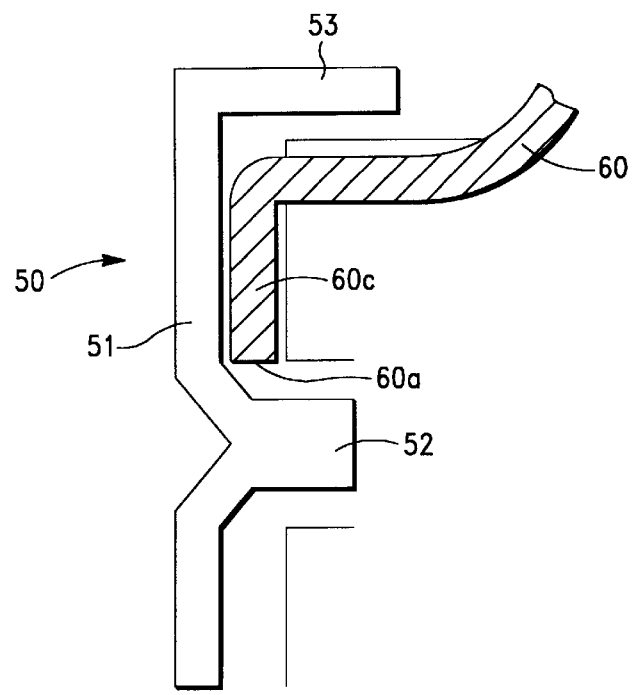
FIG. 7B is a diagram illustrating a second arrangement of the light condensing plate and the light guiding member.

As shown in FIGS. 7A and 7B, an alternate embodiment includes an end portion 60c of the light guiding member 60, consisting of an optical fiber, for example, which extends along the back side of the light condensing plate 50. In this case, the flash-light from the optical fiber is condensed from the back side of the light receiving portion 51.

A described above, in the data recording device for a disposable camera of the present invention, a light condensing plate consisting of a light-transmitting resin with a fluorescent substance dispersed therein, is used as an element for condensing external light to be used as the light source for data recording. The external light incident on the surface of the light condensing plate enters this plate and is absorbed by the fluorescent substance. The fluorescent substance emits those fluorescence components whose wavelength is longer than that of the incident light. The majority of the fluorescence components emitted is propagated through the light condensing plate as it is reflected by the interface between the light condensing plate and the ambient air before it is condensed at the light emitting surface, which is at the end of the light condensing plate, and emitted from this light emitting surface. Thus, unlike the case in which a condensing lens is used, it is also possible to efficiently condense scattered light, so that a sufficient quantity of external light can be condensed for data recording, whereby it is possible to record a data pattern clearly on the photographic film.

The fluorescent substance may consist of a fluorescent dye, a fluorescent pigment or the like capable of emitting fluorescence of various colors. The color of the light source for recording data is the fluorescent color of the fluorescent substance used, so that it is possible to effect data pattern recording with a higher level of visual recognizability than in the case in which white light is used.

Further, in the light condensing plate of the present invention, the light receiving portion thereof is formed in a rectangular configuration elongated in the direction of the height of the data pattern to be recorded on the photographic film, thereby enhancing the external-light condensing efficiency.

Also, in the light condensing plate of the present invention, a V-shaped groove having a predetermined depth in the direction of the back side of the film case toward the liquid crystal panel is formed in the surface of the section of the light receiving portion where the light emitting portion is located. Thus, due to the inclined surfaces of the V-shaped groove, the light propagated through the light condensing plate is efficiently condensed at the light emitting portion, thereby enhancing the light emission effect of the light emitting portion. Alternatively, an end portion of the light receiving portion of the light condensing plate is bent backward to form the light emitting portion, with the bent portion forming an inclined surface. The inclined surface acts to condense the fluorescence (propagated through the light condensing plate) efficiently at the light emitting portion of the plate.

In addition, in the light condensing plate of the present invention, there is provided an edge end portion which can be visually observed through the finder with which the disposable camera is equipped, whereby a judgment is made as to whether or not flash-light emission is necessary for photographing by visually observing the light emitting condition of the edge end portion at the time of photographing.

Further, the light condensing plate is equipped with a flash-light receiving portion for receiving flash-light emitted from the flash-light unit with which the disposable camera is equipped. The condensing plate condenses the flash-light, which is emitted when the exposure is insufficient, as the light source for data recording, whereby it is always possible to record a clear data pattern. When a separate light guiding member for condensing flash-light, such as an optical fiber, is provided, the same effect can be achieved.

Further, in the light condensing plate of the present invention, the light emitting surface of the light emitting portion is formed as a rough surface, whereas the remaining end surfaces of the condensing plate are formed as mirror finished surfaces. This reduces the quantity of light emitted from end surfaces other than the light emitting surface, thereby making it possible to augment the quantity of light emitted from the light emitting surface.

Further, in the present invention, the light condensing plate is attached to a side of the disposable camera in a point-contact or line-contact arrangement. It is not attached to the side of the disposable camera in close contact, which prevents the light propagated through the light condensing plate from leaking out from the close-contact section, thereby making it possible to realize an efficient light condensing operation.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A data recording device for a disposable camera, comprising:
    a data recording liquid crystal panel for forming a light transmitting data pattern for recording a data pattern in a predetermined area of a photographic film in the disposable camera,
    a light condensing element for forming illumination light for illuminating said liquid crystal panel by condensing external light, and
    said light condensing element comprising a light condensing plate formed of a light-transmitting resin with a fluorescent substance dispersed in said resin.

2. A data recording device for a disposable camera according to claim 1,
    wherein said light condensing plate comprises a light receiving portion having an external light receiving surface and a light emitting portion protruding from a back side of said light receiving portion and having a light emitting surface,
    said light emitting surface being opposed to an incident side of said liquid crystal panel.

3. A data recording device for a disposable camera according to claim 2 including a film case, the data pattern having a height in a vertical direction of said film case, and wherein said light receiving portion is formed as a rectangle which is longer in the direction of the height of the data pattern to be recorded on the photographic film.

4. A data recording device for a disposable camera according to claim 2,
    comprising a V-shaped groove formed in said light receiving portion and extending to said light emitting portion.

5. A data recording device for a disposable camera according to claim 2,
    wherein said light emitting portion is formed at a substantially right angle to said light receiving portion and comprising a bent section formed between said light receiving and emitting portions, and
    comprising an inclined surface formed on said bent section and inclined at an angle less than 90° with respect to said external light receiving surface.

6. A data recording device for a disposable camera according to claim 2, wherein said light receiving portion is flat.

7. A data recording device for a disposable camera according to claim 2, wherein said light receiving portion is curved.

8. A data recording device for a disposable camera according to claim 2,
    comprising a view finder with a field of view, and
    wherein said light condensing plate comprises an end portion extending into said field of view of said view finder.

9. A data recording device for a disposable camera according to claim 2,
    comprising a flash unit, and
    wherein said light condensing plate comprises a flash light receiving portion for receiving the light emitted from said flash unit.

10. A data recording device for a disposable camera according to claim 2,
    comprising a flash unit, and
    a light guiding member for guiding pair of a flash light emitted from said flash unit to said light condensing plate.

11. A data recording device for a disposable camera according to claim 1,
    wherein said light emitting surface of said light condensing plate is rough and wherein said light emitting portion includes mirror finished surfaces.

12. A data recording device for a disposable camera according to claim 1,
    comprising a support surface on a side of said disposable camera, and
    wherein said light condensing plate is point-contact mounted to said support surface.

13. A data recording device for a disposable camera according to claim 1,
    comprising a support surface on a side of said disposable camera, and
    wherein said light condensing plate is line-contact mounted to said support surface.

* * * * *